Patented Feb. 20, 1945

2,369,949

UNITED STATES PATENT OFFICE 2,369,949

TRIAZOLE DERIVATIVES

Gaetano F. D'Alelio, Pittsfield, Mass., assignor to General Electric Company, a corporation of New York No Drawing. Application November 25, 1942,
Serial No. 466,919

11 Claims. (Cl. 260—239.6)

This invention relates to new chemical compounds and more particularly to triazole derivatives. The invention especially is concerned with the production of new and useful sulfamylarylamino triazoles.

The triazole derivatives of this invention may be represented by the following general formula:

where R represents a member of the class consisting of hydrogen and monovalent hydrocarbon radicals, and Y represents a member of the class consisting of divalent aromatic and nuclearly substituted, more particularly nuclearly halogenated, aromatic hydrocarbon radicals.

Illustrative examples of monovalent hydrocarbon radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, propenylphenyl, tertiary-butylphenyl, methylnaphthyl, etc.); and aryl-substituted aliphatic (e. g., benzyl, cinnamyl, phenylethyl, phenylpropyl, etc.). Preferably R represents hydrogen, in which case the compounds correspond to the following general formula:

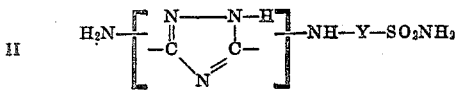

where Y has the same meaning as given above with reference to Formula I. However, there also may be produced in accordance with the present invention chemical compounds corresponding to the following general formula:

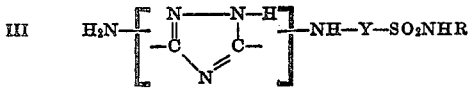

where R and Y have the same meanings as given above with reference to Formula I.

Illustrative examples of divalent radicals that Y in the above formulas may represent are: divalent aromatic, e. g., phenylene, xenylene, naphthylene, etc.; divalent aliphatic-substituted aromatic, e. g., 2,4-tolylene, ethyl 2,5-phenylene, isopropyl 3,4-phenylene, 1-butyl 2,4-naphthylene, 1,4-dimethyl 2,3-phenylene, etc.; radicals that may be classed either as divalent aliphatic-substituted aromatic or as aromatic-substituted aliphatic and wherein the free bond of the aromatic nucleus is attached to the sulfamyl radical, e. g., 4,alpha-tolylene, 3,beta-phenyleneethyl, 4,alpha-xylylene, 2,gamma-phenylenebutyl, etc.; and their homologues, as well as those divalent radicals with one or more of their nuclear hydrogen atoms replaced by a substituent, e. g., acyl, alkyl, alkenyl, hydroxy, alkoxy, aryloxy, carboalkoxy, carboaroxy, a —SO₂NHR grouping in addition to the single —SO₂NHR grouping shown in the above formula, etc. Specific examples of substituted divalent radicals that Y may represent are chlorophenylene, bromophenylene, chloroxenylene, chloronaphthylene, chlorotolylene, bromotolylene, ethoxyphenylene, acetophenylene, acetoxyphenylene, aminophenylene, carboethoxyphenylene, carbophenoxyphenylene, hydroxyphenylene, phenoxyphenylene, methylphenylene (tolylene), allylphenylene, etc. Preferably Y is phenylene or tolylene.

The new compounds of this invention may be used, for example, as pharmaceuticals, insecticides, fungicides, plasticizers and as intermediates in the preparation of derivatives thereof, e. g., ureido, hydrazino, acyl, carbamyl, amidine, methylol, methylene, etc., derivatives of the individual compound embraced by Formula I. These new compounds are especially valuable in the preparation of synthetic resinous compositions. Thus, they may be condensed with, for instance, aldehydes, including polymeric aldehydes, hydroxyaldehydes and aldehyde-addition products, to yield condensation products having particular utility in the plastics and coating arts. Such condensation products are more fully described and are specifically claimed in my co-pending application Serial No. 466,918, filed concurrently herewith and assigned to the same assignee as the present invention.

Various methods may be employed to produce the chemical compounds of this invention. I prefer to prepare them by effecting reaction under heat between a hydrazine corresponding to the general formula IV  NH₂—NHR where R has the same meaning as given above with reference to Formula I, and a sulfamylaryl biguanide corresponding to the general formula V 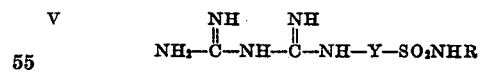

where R and Y have the same meanings as given above with reference to Formula I. This reaction is carried out under conditions such as will result in the formation of ammonia or, if an acid is present, an ammonium salt as a by-product of the reaction. This reaction may be represented by the following general equation:

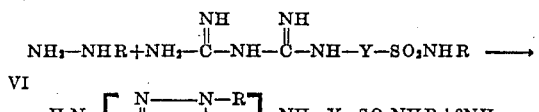

Or, when the reaction is carried out in the presence of an acid effective in binding the ammonia liberated during the reaction, it may be represented by the following general equation:

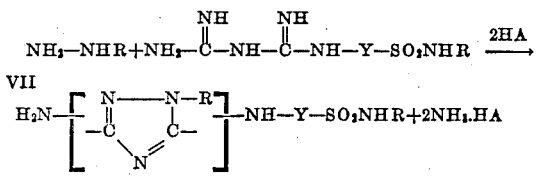

In Equations VI and VII, R and Y have the same meanings as given above with reference to Formula I, and HA (Equation VII) represents an acid, which may be either organic or inorganic but which preferably is inorganic. Illustrative examples of organic and inorganic acids that may be used to bind the ammonia in the form of a salt are oxalic, acetic, hydrochloric, hydrobromic, sulfuric, etc. The reaction preferably is carried out in an aqueous solution containing an inorganic acid. However, other solvents or mixtures of solvents may be used, e. g., alcohols, ethers, dioxane, benzene, etc. The reaction may be carried out under a variety of temperature and pressure conditions. Ordinarily the reaction is effected at atmospheric pressure under reflux at the boiling temperature of the reaction mass.

Illustrative examples of hydrazines that may be used, depending upon the particular end-product desired, are:

Hydrazine (or hydrazine hydrate)
Methyl hydrazine
Ethyl hydrazine
Propyl hydrazine
Isobutyl hydrazine
Phenyl hydrazine
Allyl hydrazine
Propenyl hydrazine
Cyclohexyl hydrazine
Tolyl hydrazine
Xylyl hydrazine
Phenethyl hydrazine
Ethylphenyl hydrazine
Octyl hydrazine Illustrative examples of sulfamylaryl biguanides that may be employed, depending upon the particular end-product desired, are:

Ortho-, meta- and para-sulfamylphenyl biguanides
Sulfamyltolyl biguanides
Sulfamylxylyl biguanides
Sulfamylnaphthyl biguanides
Sulfamyl-(ethyl)-phenyl biguanides
Methyl-sulfamylphenyl biguanides
Ethyl-sulfamylphenyl biguanides
Ethyl-sulfamyl-(fluoro)-phenyl biguanides
Isobutyl-sulfamylphenyl biguanides
Allyl-sulfamylphenyl biguanides
Propenyl-sulfamylphenyl biguanides
Ethyl-sulfamyltolyl biguanides
Phenyl-sulfamyltolyl biguanides
Sulfamyl-(chloro)-phenyl biguanides
Sulfamyl-(bromo)-phenyl biguanides
Tolyl-sulfamylxylyl biguanides
Xylyl-sulfamylphenyl biguanides
Sulfamyl-(iodo)-tolyl biguanides
Phenethyl-sulfamylphenyl biguanides
Ethylphenyl-sulfamylphenyl biguanides.
Phenyl-sulfamyl-(bromo)-tolyl biguanides.

The sulfamylaryl biguanides used in practicing the present invention are prepared by methods such as described, for example, in my copending application Serial No. 380,670, filed February 26, 1941, now Patent No. 2,331,375, issued October 12, 1943, and assigned to the same assignee as the present invention, with particular reference to the production of a mono-(biguanido) benzene monosulfonamide.

In order that those skilled in the art better may understand how the present invention may be carried into effect, the following examples are given by way of illustration and not by way of limitation. All parts are by weight.

*Example 1*

This example illustrates the preparation of para-sulfamylanilino amino 1,2,4-triazoles, which also may be named para-sulfamylphenylamino amino 1,2,4-triazoles and may be represented by the formula

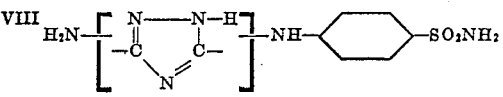

| | Parts |
|---|---|
| Para-sulfamylphenyl biguanide | 128 |
| Hydrazine hydrate (in 34.5 parts water) | 25 |
| Concentrated aqueous solution of hydrochloric acid (approx. 38% HCl) | 96 | were mixed with 200 parts water and the resulting mixture then heated under reflux at the boiling temperature of the mass for 17 hours, after which the solution was chilled and the crystalline solid that had precipitated out of the solution was removed by filtration. The solid material comprising impure para-sulfamylanilino amino 1,2,4-triazoles was dissolved in boiling water, decolorized by treatment of the solution with a decolorizing carbon, and crystallized by cooling the hot water solution. The purified para-sulfamylanilino amino 1,2,4-triazoles separated in the form of long, white needles, which were removed by filtration and dried. A yield of 50 parts of the purified material was obtained.

The corresponding ortho and meta derivatives are prepared by using 128 parts of ortho- or meta-sulfamylphenyl biguanide instead of 128 parts of para-sulfamylphenyl biguanide. The ortho derivatives may be represented by the formula

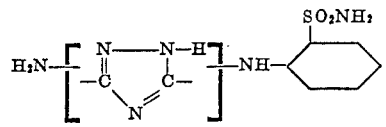

or by the formula

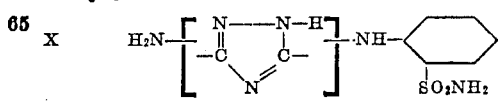

The meta derivatives may be represented by the formula

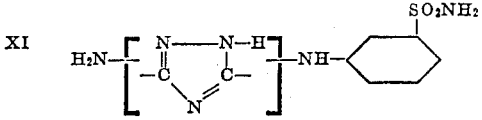

or by the formula

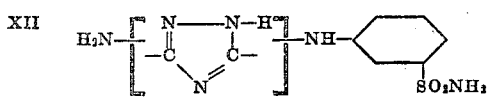

Example 2

1-methyl para-sulfamylanilino amino 1,2,4-triazoles are prepared in the same manner as described under Example 1 with the exception that 23 parts of methyl hydrazine are used in place of 25 parts of hydrazine hydrate.

Example 3

1-phenyl para-sulfamylanilino amino 1,2,4-triazoles are prepared in the same manner as described under Example 1 with the exception that 54 parts of phenyl hydrazine are used instead of 25 parts of hydrazine hydrate.

Example 4

Para-(methylsulfamyl)-anilino amino 1,2,4-triazoles are produced in the same manner as described under Example 1 with the exception that 135 parts of para-(methylsulfamyl)-phenyl biguanide are used in place of 128 parts of para-sulfamylphenyl biguanide.

Example 5

(4-sulfamylnaphthyl-1 amino) amino 1,2,4-triazoles are prepared in the same manner as described under Example 1 with the exception that 153 parts of (4-sulfamylnaphthyl-1) biguanide are used instead of 128 parts of para-sulfamylphenyl biguanide.

More specific examples of compounds embraced by Formula I that may be produced in accordance with the present invention are listed below:

1-methyl ortho-sulfamylanilino amino 1,2,4-triazoles
1-methyl meta-sulfamylanilino amino 1,2,4-triazoles
1-phenyl ortho-sulfamylanilino amino 1,2,4-triazoles
1-phenyl meta-sulfamylanilino amino 1,2,4-triazoles
Ortho-(methylsulfamyl)-anilino amino 1,2,4-triazoles, which may be represented by the formula

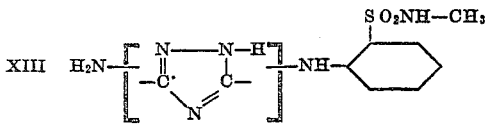

Meta-(methylsulfamyl)-anilino amino 1,2,4-triazoles
Sulfamyltoluilo amino 1,2,4-triazoles
1-ethyl sulfamylanilino amino 1,2,4-triazoles
1-methyl sulfamyltoluido amino 1,2,4-triazoles
1-phenyl sulfamyltoluido amino 1,2,4-triazoles
1-methyl methylsulfamyltoluido amino 1,2,4-triazoles
1-phenyl ethylsulfamyltoluido amino 1,2,4-triazoles, which may be represented by the formula

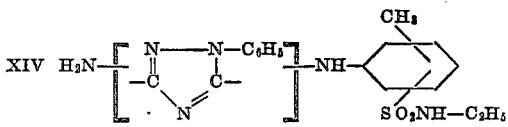

Sulfamylxylidino amino 1,2,4-triazoles
1-methyl sulfamylxylidino amino 1,2,4-triazoles
1-isobutyl sulfamylanilino amino 1,2,4-triazoles
1-allyl sulfamylanilino amino 1,2,4-triazoles
1-propenyl sulfamylanilino amino 1,2,4-triazoles
1-cyclohexyl sulfamylanilino amino 1,2,4-triazoles
1-tolyl sulfamylanilino amino 1,2,4-triazoles
1-xylyl sulfamylanilino amino 1,2,4-triazoles
Sulfamyl-(chloro)-anilino amino 1,2,4-triazoles
Sulfamyl-(bromo)-toluido amino 1,2,4-triazoles, which may be represented by the formula

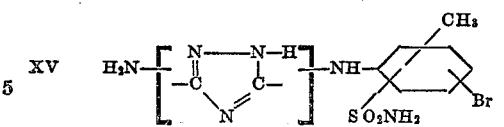

Sulfamyl-(iodo)-anilino amino 1,2,4-triazoles
Sulfamyl-(fluoro)-anilino amino 1,2,4-triazoles
1-phenethyl sulfamylanilino amino 1,2,4-triazoles, which may be represented by the formula

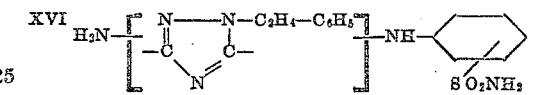

1-ethylphenyl sulfamylanilino amino 1,2,4-triazoles, which may be represented by the formula

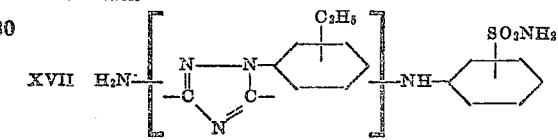

1-methyl propylsulfamylanilino amino 1,2,4-triazoles
1-phenyl naphthylsulfamylanilino amino 1,2,4-triazoles
1-phenyl phenylsulfamylanilino amino 1,2,4-triazoles
Sulfamylnaphthylamino amino 1,2,4-triazoles
1-methyl sulfamylnaphthylamino amino 1,2,4-triazoles, which may be represented by the formula

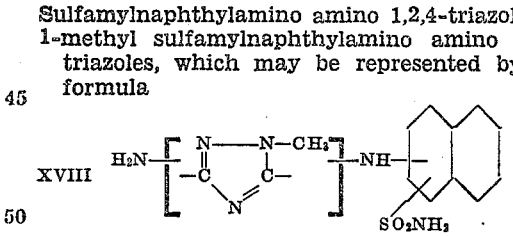

or by the formula

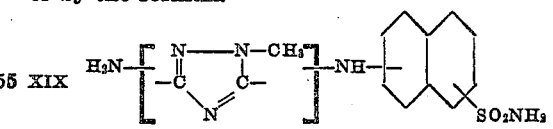

Sulfamylxenylamino amino 1,2,4-triazoles, which may be represented by the formula

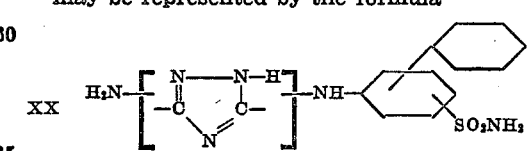

or by the formula

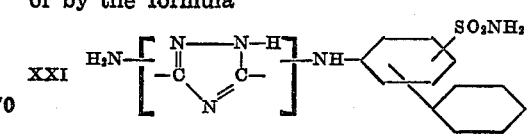

Sulfamyl-(ethyl)-anilino amino 1,2,4-triazoles

It will be understood, of course, by those skilled in the art that, in the compounds listed above the amino grouping may be attached to either the 3 or the 5 carbon atom of the triazole nucleus, the carbon atom which is not joined to an amino grouping being attached to the sulfamylaryl-amino grouping; and, also, that the sulfamyl grouping may be attached to any of the reactive carbon atoms of the aromatic nucleus.

What I claim as new and desire to secure by Letters Patent of the United States is:

1. Chemical compounds corresponding to the general formula

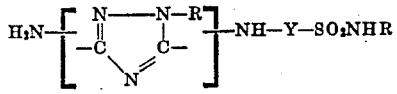

where R represents a member of the class consisting of hydrogen and monovalent hydrocarbon radicals, and Y represents a member of the class consisting of divalent aromatic and nuclearly halogenated aromatic hydrocarbon radicals.

2. Chemical compounds corresponding to the general formula

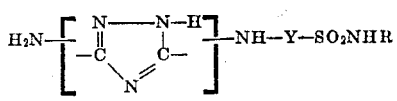

where R represents a member of the class consisting of hydrogen and monovalent hydrocarbon radicals, and Y represents a member of the class consisting of divalent aromatic and nuclearly halogenated aromatic hydrocarbon radicals.

3. Chemical compounds corresponding to the general formula

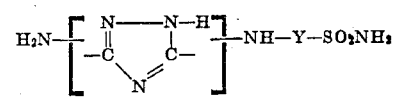

where Y represents a divalent aromatic hydrocarbon radical.

4. Chemical compounds corresponding to the general formula

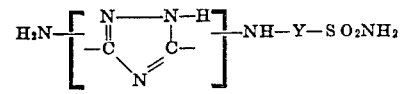

where Y represents a phenylene radical.

5. Ortho-sulfamylanilino amino 1,2,4-triazoles represented by the formula

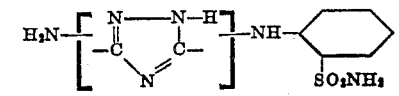

6. Meta-sulfamylanilino amino 1,2,4-triazoles represented by the formula

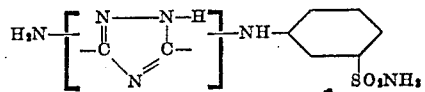

7. Para-sulfamylanilino amino 1,2,4-triazoles represented by the formula

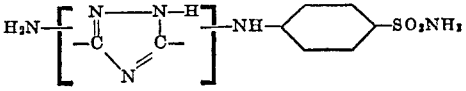

8. The method of preparing chemical compounds corresponding to the general formula

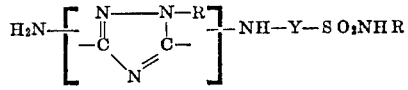

where R represents a member of the class consisting of hydrogen and monovalent hydrocarbon radicals, and Y represents a member of the class consisting of divalent aromatic and nuclearly halogenated aromatic hydrocarbon radicals, said method comprising effecting reaction under heat between a hydrazine corresponding to the general formula $$NH_2-NHR$$

where R has the meaning above given, and a sulfamylaryl biguanide corresponding to the general formula

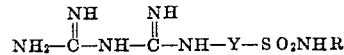

where R and Y have the meanings above given.

9. A method as in claim 8 wherein the reaction is carried out in the presence of an acid effective in binding the ammonia liberated during the reaction.

10. The method of preparing para-sulfamylanilino amino 1,2,4-triazoles which comprises effecting reaction under heat between para-sulfamylphenyl biguanide and hydrazine hydrate.

11. The method of preparing para-sulfamylanilino amino 1,2,4-triazoles which comprises effecting reaction under heat between para-sulfamylphenyl biguanide and hydrazine hydrate in the presence of an acid effective in binding the ammonia liberated during the reaction.

GAETANO F. D'ALELIO.